United States Patent [19]

Slezak

[11] 3,724,101
[45] Apr. 3, 1973

[54] TEACHING GARMENT

[76] Inventor: Imogene F. Slezak, 520 North 5th, Carlisle, Iowa 50047

[22] Filed: June 16, 1971

[21] Appl. No.: 153,700

[52] U.S. Cl................35/35 R, 2/69, 2/250, 40/129 A
[51] Int. Cl..............................G09b 1/08
[58] Field of Search........35/1, 35 R, 35 H, 35 J, 8 R; 40/1.5, 1.6, 129 A; 2/1, 69, 246, 249, 250, 251

[56] References Cited

UNITED STATES PATENTS

| | | | |
|---|---|---|---|
| 3,624,686 | 11/1971 | Beals | 35/8 R |
| 2,369,804 | 2/1945 | Schoolfield et al. | 35/35 H |
| 3,370,370 | 2/1968 | Lippman | 40/129 A |
| 3,178,784 | 4/1965 | Krauthamer | 2/250 X |
| 3,484,974 | 12/1969 | Culmone | 40/129 A |

FOREIGN PATENTS OR APPLICATIONS 359,862  2/1906  France .......................35/1

*Primary Examiner*—Wm. H. Grieb
*Attorney*—Zarley, McKee & Thomte

[57] ABSTRACT

A cape for a teacher to wear having 21 colored patch pockets on the front with detachable patches thereon displaying the consonants of the alphabet. A vertical row of 10 patches down the center include long vowels in black on circles of white felt and short vowels on triangles of white felt. The patches having consonants and vowels may be removed from the garment and placed on a display board for spelling out words. The consonant patches are rectangular or square in shape. The pockets carry items or cards having first letters corresponding to the consonant on the patch.

9 Claims, 5 Drawing Figures

PATENTED APR 3 1973     3,724,101
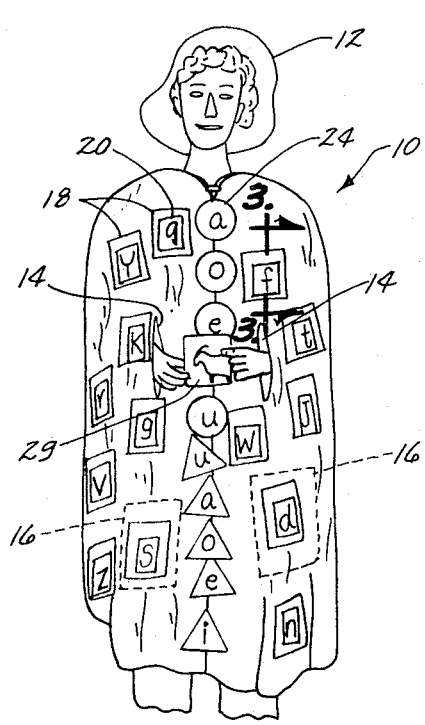
Fig. 1
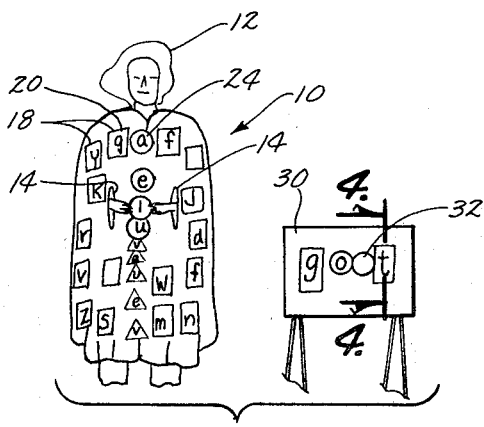
Fig. 2
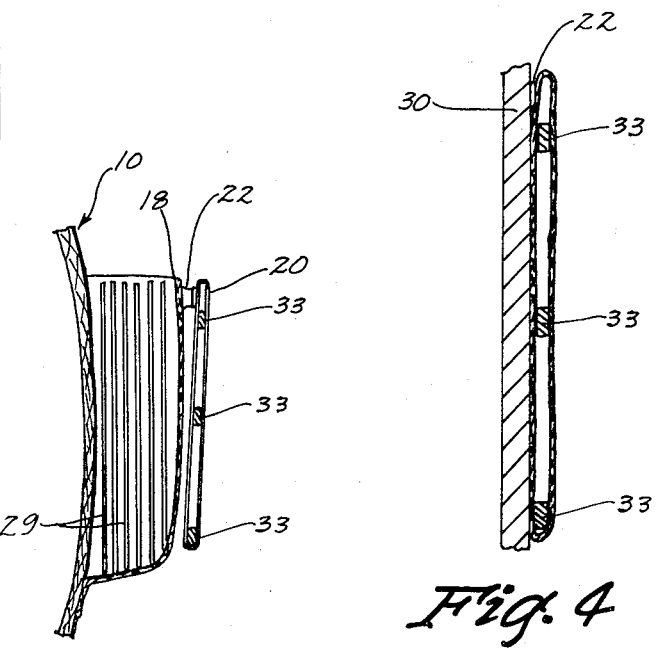
Fig. 3
Fig. 4
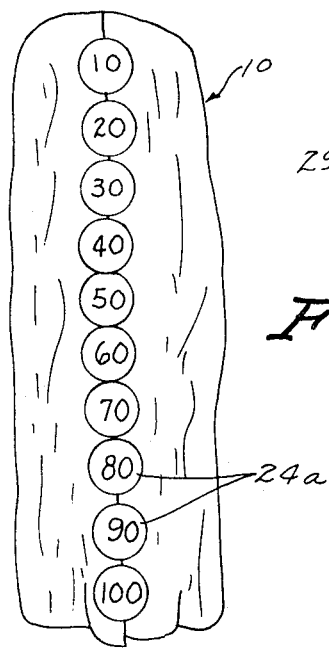
Fig. 5
INVENTOR
IMOGENE F. SLEZAK
BY
Zarley, McKee & Thomte
ATTORNEYS

TEACHING GARMENT

The teaching of basic skills in the lower grades requires considerable imagination for motivating children to learn. The teaching garment of this invention makes it possible to more easily motivate children to learn phonics, letters of the alphabet and spelling of words, numbers, colors and geometric shapes.

The cape the teacher wears has a different pocket on the front for displaying each of the consonants on a detachable patch. There are 21 pockets in seven different colors, three pockets for each color. Down the front of the cape is a vertical row of 10 detachable patches including long vowels in black on circles of white felt and short vowels on triangles of white felt. All of the patches carry magnetic pieces inside so that they may be held in place on a display board for the spelling out of words. A snap fastener is used for detachably connecting the patches to the cape. The numbers may also be taught by using the vertical row of patches and displaying 10's in place of the vowels counting by 10's to 100.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a front elevational view of a teacher wearing the cape of this invention;

FIG. 2 is a reduced in scale perspective view of a teacher wearing the cape of this invention and using the display board for spelling out words;

FIG. 3 is a cross sectional view taken along line 3 — 3 in FIG. 1;

FIG. 4 is a cross sectional view taken along line 4 — 4 in FIG. 2; and

FIG. 5 is a fragmentary view of an alternate arrangement of patches in a vertical row down the front of the cape.

The teaching garment of this invention is referred to generally in FIG. 1 by the reference numeral 10. More specifically, the teacher 12 is wearing a cape garment having arm openings 14. Large pockets 16 hidden from the outside and accessible only from the inside are provided on opposite sides of the garment. The front of the garment includes 21 patch pockets 18 in seven different colors providing three pockets of each color. These colors represent the basic colors in the color spectrum. The consonants of the alphabet are displayed on detachable patches 20 secured by snap fasteners 22 to each of the pockets 18. The patches 20 are either rectangular or square in shape.

Down the center of the cape is a row of ten detachable patches 24 displaying the vowels of the alphabet with five circular patches for long vowels in black on white felt and five triangular patches of white felt for the short vowels. The consonants are in black on white felt also.

Each of the pockets 18 include objects 29 to correspond with the consonant. For example, with the letter C might be cotton, a candle or miniature car. Other consonant pockets have objects also and there are cards with pictures to fit the pockets if more consonant sounds are needed.

To teach the spelling of words the patches or letters in the pockets may be removed and placed on a magnetic board 30 in order. If two vowels are in a word the first may be long and the second one silent so the second one is merely turned face to the board as seen at 32 for the letter A in the word goat spelled out on the board. To change the beginning or ending sound to make a new word, it is merely necessary to change the consonants. Different vowels may be changed as desired. In the inside large pockets 16 extra letters or other teaching items may be stored. Magnets 33 are provided in the patches.

It is understood that various scripts may be written around the use of the cape and the related teaching accessories limited only by the imagination of the teacher. A magic oriented program has been found very successful and has been tabbed "Margo Magoo the Magic Magician."

The teaching of numbers may also be accomplished by substituting the 10's down the front row for the 10 vowels as seen at 24A in FIG. 5.

Thus it is seen that a teacher may be using the teaching garment of this invention to teach the eight basic colors, the geometric shapes of a circular, rectangle, square and triangle, all the letters of the alphabet, and the numbers. It will fit most any reading program with a teacher's ingenuity and provide children with another motivation tool for learning. The children will be having fun and the teacher will enjoy greater success in her work.

I claim:

1. A teaching garment and display board comprising,
   a garment for the front side of a teacher having a plurality of pockets exposed to the front of the garment,
   a detachable patch secured to the front of each of said pockets and said patch having indicia thereon, and being entirely exposed on its front side for viewing and ease of separation from said pocket, each of said pockets containing an object related to the indicia on the associated patch,
   a display board on which said patches from said garment are placed during teaching, and
   means on said patches for detachably securing said patches to said display board.

2. The structure of claim 1 wherein a vertical row of a second group of detachable patches having indicia thereon is provided down the front of said garment.

3. The structure of claim 2 wherein said indicia on the patch on each of said pockets is a consonant and the indicia on each of said patches in said vertical row is a vowel.

4. The structure of claim 3 wherein said patches in said vertical row include two different shapes for long and short vowels respectively.

5. The structure of claim 4 wherein said plurality of pockets includes a pocket for each consonant in the alphabet.

6. The structure of claim 5 wherein said plurality of pockets includes seven different colors.

7. The structure of claim 4 wherein the colors of the patches for the long and short vowels are different.

8. The structure of claim 7 wherein said vertical row includes ten patches, five for short vowels and five for long vowels.

9. The structure of claim 8 wherein said plurality of pockets includes patches including square and rectangular shapes.

* * * * *